(12) United States Patent
Aguilar et al.

(10) Patent No.: US 6,873,858 B1
(45) Date of Patent: Mar. 29, 2005

(54) BRIDGE MECHANISM, AND ASSOCIATED METHOD, FOR MULTI-NETWORK RADIO COMMUNICATION SYSTEM

(75) Inventors: Michael Aguilar, Richardson, TX (US); Vilat Keomoungkhoun, Plano, TX (US); Gil Stevens, Fairview, TX (US)

(73) Assignee: Alcatel, Paris (FR)

( * ) Notice: Subject to any disclaimer, the term of this patent is extended or adjusted under 35 U.S.C. 154(b) by 489 days.

(21) Appl. No.: 10/007,093

(22) Filed: Dec. 6, 2001

(51) Int. Cl.[7] .......................... H04M 1/00; H04Q 7/20; H04B 1/38; H04L 12/28

(52) U.S. Cl. ................ 455/552.1; 455/445; 455/550.1; 455/554.2; 455/560; 370/395.5; 370/401

(58) Field of Search .......................... 455/445, 554.2, 455/451, 515, 550.1, 552.1, 560, 561, 422.1, 425, 435.1, 435.2, 455, 466, 464; 370/340, 400, 401, 386, 312, 313, 328, 329, 338, 342, 352–356, 368, 371, 395.43, 395.5, 395.52, 395.53

(56) References Cited

U.S. PATENT DOCUMENTS

| | | | |
|---|---|---|---|
| 5,377,186 A | | 12/1994 | Wegner et al. |
| 6,075,855 A | | 6/2000 | Christiansen et al. |
| 6,094,578 A | * | 7/2000 | Purcell et al. ............ 455/426.1 |
| 6,278,697 B1 | * | 8/2001 | Brody et al. ................. 370/310 |
| 6,411,632 B2 | * | 6/2002 | Lindgren et al. ............ 370/466 |
| 6,560,327 B1 | * | 5/2003 | McConnell ................. 379/229 |
| 6,560,456 B1 | * | 5/2003 | Lohtia et al. ............... 455/445 |
| 6,563,919 B1 | * | 5/2003 | Aravamudhan et al. .... 379/230 |
| 6,678,517 B2 | * | 1/2004 | Naim et al. .............. 455/414.1 |
| 6,721,395 B2 | * | 4/2004 | Martinez ...................... 379/45 |
| 2002/0167906 A1 | * | 11/2002 | La Porta et al. ............ 370/252 |
| 2003/0179772 A1 | * | 9/2003 | Niklasson ................... 370/466 |

* cited by examiner

*Primary Examiner*—William Trost
*Assistant Examiner*—Meless Zewdu
(74) *Attorney, Agent, or Firm*—Robert H. Kelly; Bobby D. Slaton; V. Lawrence Sewell

(57) ABSTRACT

Apparatus, and an associated method, forming a bridge mechanism bridging a legacy cellular network with a successor-generation cellular network. A communication service available only in the successor-generation network is made available to a mobile station operable pursuant to a service subscription in the legacy network. The bridge mechanism forms a hybrid mobile switching center capable of operation in both the legacy network and the successor-generation network.

10 Claims, 4 Drawing Sheets

BRIDGE MECHANISM, AND ASSOCIATED METHOD, FOR MULTI-NETWORK RADIO COMMUNICATION SYSTEM

The present invention relates generally to a manner by which to permit a mobile station operable in a cellular, or other radio, communication system access to a communication service. More particularly, the present invention relates to apparatus, and an associated method, by which to facilitate access of the mobile station operable in a first network, to a communication service available at a second network.

A service, unavailable to the mobile station by way of a service subscription to the first network, is made available to the mobile station. A service migration strategy is thereby provided that permits supplementary service control of a mobile station operable in the first network to provide to such mobile station the services that would otherwise be unavailable to the mobile station.

BACKGROUND OF THE INVENTION

The communication of both voice and non-voice data through the use of cellular, and, other radio, communication systems has achieved wide popularity in recent years. The geographical areas of many populated parts of the world have installed thereon the network infrastructures of cellular, and other, radio communication systems.

In a cellular communication system, typically, communications are effectuated through the use of a mobile station. A mobile station is a radio transceiver that is constructed generally to mimic operation of a conventional, telephonic device. That is to say, a mobile station is generally constructed to permit a user of the mobile station to communicate voice, as well as non-voice, data in manners corresponding to the manners by which a conventional, telephonic station is utilized.

Communication mobility is inherently permitted when communications are effectuated by way of a mobile station as the communications are effectuated by way of the radio links. Telephonic communications are thereby effectuable through use of a mobile station at locations at which telephonic communications would not otherwise be possible. Communications in a cellular communication system by way of a mobile station is provided pursuant to a service subscription to which a user of the mobile station subscribes. Subscription for any of various levels of service is generally available. And, different communication networks, sometimes overlaid one upon the other, sometimes provide different service features.

Various standards have been promulgated relating to various types of cellular communication systems. And, various types of cellular communication systems have been constructed corresponding to such standards. Cellular communication systems have evolved over time to incorporate technological advancements as such advancements have become commercially feasible.

So-called, first-generation communication systems generally rely upon the use of conventional, analog communication techniques. Such systems are referred to as being first-generation systems as such systems were the first-implemented cellular communication systems of widespread, commercial usage.

So-called, second-generation communication systems generally make use of digital communication techniques. Such communication systems are referred to as being second-generation as the systems have generally been implemented subsequent to implementation of the earlier-implemented, first-generation systems. In some geographical areas, second-generation systems have been overlaid upon first-generation systems.

Analogously, so-called, third-generation systems, as well as so-called 2.5 generation systems have also been under development Third-generation systems also make use of digital communication techniques and also provide for multiple data-rate communications. The infrastructures of such systems can also be overlaid upon the same geographical areas at which first-generation or second-generation systems are installed.

Investments required to install any cellular communication system are significant. A general migration of users of a prior-generation system, i.e., a legacy system, to a new-generation system, i.e., a successor-generation system is anticipated while the prior-generation system is continued to be utilized. But, because newer-generation systems generally provide for, or otherwise permit, services unavailable in the prior-generation system, an operator of a prior-generation system might well be required to provide a manner by which a subscriber to the prior-generation system is able to utilize a service available in the new-generation system. By making available the additional service to the subscriber to the prior-generation system reduces the likelihood that the subscriber to the prior-generation system shall terminate the subscription to such system and instead subscribe to the new-generation system.

A service provider that provides service features, available to be used by a subscriber to a cellular communication system might be willing to invest only in a new-generation system and not make corresponding investments that permit the communication service to be provided to a subscriber of a legacy system. The only manner by which an operator of the legacy system is able to contract to provide subscribers of the legacy system with the communication service is by way of the new-generation communication system. As prior-generation and new-generation systems use different types of communication protocols, and are constructed in different manners, access to a service control point of a new-generation system by a subscriber of the existing-generation system is not readily available.

If a manner could be provided by which to permit a subscriber to the existing-generation communication system to communication services available in a new-generation communication system, improved access to new types of communication services would be made available to the subscribers of the prior-generation communication system.

It is in light of this background information related to radio communication systems that the significant improvements of the present invention have evolved.

SUMMARY OF THE INVENTION

The present invention, accordingly, advantageously provides apparatus, and an associated method, by which to permit a mobile station operable in a cellular, or other radio, communication system to access a communication service.

Through operation of an embodiment of the present invention, a manner is provided by which to facilitate access of the mobile station, operable in a first network, to utilize a communication service available at a second communication network. A service, unavailable to the mobile station by way of a service subscription to the first communication network, is made available to the mobile station by way of communications with the second communication network. Even though the communication network to which the mobile station is operable fails to provide the additional communication service, through access to the second communication network, the communication service is made available to the mobile station.

When the communication network to which the subscription of the mobile station for service is subscribed is a legacy network that fails to offer a particular communication service that is, instead, offered at a successor-generation network, an embodiment of the present invention provides a manner by which the communication service is accessible by the mobile station. A service migration strategy is thereby provided by an embodiment of the present invention.

In one aspect of the present invention, a bridge mechanism is provided that forms a bridge between the legacy-generation network and the successor-generation network. The bridge mechanism includes parts that are at least functionally operable in the separate networks. When a user of a mobile station operable in the legacy network pursuant to a service subscription thereto elects to utilize a communication service, unavailable in the legacy network but available in the successor-generation network, a request is routed to the bridge mechanism. The request is routed to the functional portion of the bridge mechanism associated with the legacy network. Subsequent to detection thereat, a separate request is routed through the successor-generation network to a service control point at which the communication service is resident, or otherwise embodied. Upon detection of the request at the service control point, a grant of permission of the mobile station to utilize the communication service is made. The response is routed through the successor-generation network to the bridge mechanism. The request is routed to the second functional part of the bridge mechanism. Thereafter, the response is routed through the legacy-generation network and a communication session utilizing the communication service is formed if permission to utilize the communication service has been granted by the service control point.

In another aspect of the present invention, a mobile station operable pursuant to a service subscription to communicate in a legacy network is able to utilize a pre-paid calling plan, unavailable in the legacy network but available in a successor-generation network. When a communication session is to be formed between the mobile station and a correspondent node, a request for grant of permission by the provider of the prepaid calling service is generated. The request is routed through the legacy network to a bridge mechanism. The bridge mechanism functionally forms a bridge between the legacy network and the successor-generation network. The bridge mechanism, in turn, converts the request into a form permitting its routing through the successor-generation network to a service control point associated with the selected communication service. A grant of permission is selectably generated by the service control point, and an indication thereof is returned to the bridge mechanism. The bridge mechanism further operates to convert a message indicative of the permission grant message generated by the service control point into a form to permit its communication in the legacy network. And, thereafter, the communication session is effectuated making use of the communication service. Even though the legacy network does not provide for the communication service, the mobile station is still able to take advantage of the additional service capability provided at the successor-generation network.

In one implementation, a pre-paid calling service is provided at a GSM (Global System for Mobile Communications) communication network. A subscriber of a service subscription in an IS-41 (Interim Standard-41) standard network in which the pre-paid calling service is unavailable is able to utilize the pre-paid calling service provided in the GSM system. A bridge mechanism forming a hybrid mobile switching center bridges the separate networks and permits a service control point at which the pre-paid calling service is associated to be accessed. The hybrid mobile switching center includes functional elements forming a wireless media gateway of the IS-41 network. And, the hybrid mobile switching center also includes functional elements of a wireless softswitch of the GSM network. The pre-paid calling service is thereby provided to a subscriber for service in the legacy network.

In these and other aspects, therefore, apparatus, and an associated method, is provided for a radio communication system having a mobile station operable to communicate by way of a first network pursuant to a first-network communication service subscription. The first network is operable pursuant to a first communication-standard protocol. The first network is coupled to a second network. The second network is operable pursuant to a second communication-standard protocol. Invocation of a second-network service, resident at a second-network service control point by the mobile station, is facilitated. A bridge mechanism is coupled to receive a first-network-generated request for invocation of the second-network service by the mobile station. The bridge mechanism is at least selectably for initiating authorization of the mobile station to invoke the second-network service.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
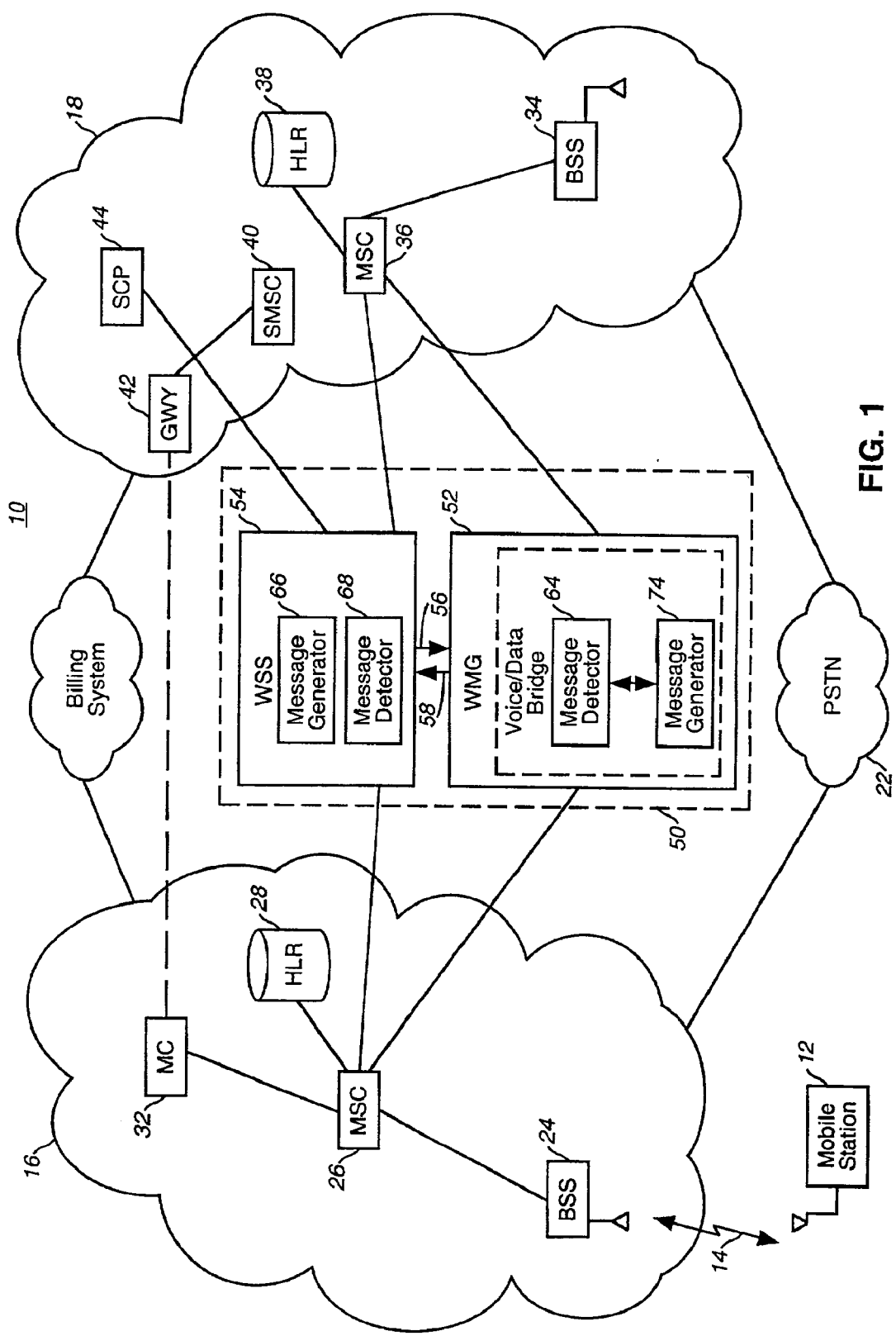
FIG. 1 illustrates a functional block diagram of a multi-network, radio communication system in which an embodiment of the present invention is operable.

Referring first to FIG. 1, a communication system, shown generally at 10, provides for radio communications with a mobile station. Here in the exemplary implementation, the mobile station 12 forms a cellular mobile station operable pursuant to a legacy, cellular communication standard, such as an IS-41 (Interim Standard-41), system promulgated by the EIA/TIA. In other implementations, of course, the mobile station is constructed to be operable in a radio communication system operable pursuant to another communication standard.

Data originated, or terminated, at the mobile station is communicated by way of a radio link, here indicated at 14, extending between the mobile station and a legacy-network 16 part of the communication system. Here, also, in the exemplary implementation, the legacy network 16 is operable pursuant to the IS-41 standard, thereby to permit communication with the mobile station 12.

The communication system also includes a successor-generation network 18. Here, the successor-network 18 forms a GSM (Global System for Mobile Communications) network constructed pursuant to a GSM specification. The networks 16 and 18 are functionally shown in the figure, represented by separate, non-overlapping cloud structures. In an actual implementation, the geographical areas encompassed by the separate networks 16 and 18 might partially, or completely, overlap. The networks 16 and 18 form the radio parts of the communication system. And, the networks 16 and 18 are coupled to a PSTN (Public-Switched, Telephonic Network) 22. During operation of the communication system, the mobile station 12 is able to communicate with a correspondent node, such as another mobile station, or a telephonic station coupled to the PSTN.

The legacy network 16 includes various network elements, here including a BSS (Base Station System) 24. The base station system includes a base transceiver station that transceives the radio-frequency signals with the mobile station 12. The base station system 24 is coupled to an MSC (Mobile Switching Center) 26. A location register, here a home location register (HLR) 28 associated with the mobile station 12 is coupled to, or resident at, the mobile switching center. The home location register includes a registry of information related to the mobile station, including service-subscription related information of the service subscription pursuant to which the mobile station is operable with the legacy network 16. An MC element 32 is also coupled to the mobile switching center 26.

The successor-generation network 18 also includes various network elements including a base station system 34 that is coupled to an MSC 36. The base station system includes a base transceiver station capable of transceiving radio-frequency signals with mobile stations (not shown) capable of communication in the GSM system. A location register, here represented as a home location register (HLR) 38 is associated with the MSC and also contains a registry including service subscription-related information related to mobile stations operable in the GSM network. The network is further shown to include an SMSC 40, a gateway 42, here forming an e-mail gateway. The e-mail gateway 42 is coupled to the SMSC 40 and also to the MC 32 of the legacy network.

A service control point (SCP) 44 is also shown at the successor-network 18. In the exemplary implementation, a pre-paid calling service is resident, or otherwise embodied or associated, at the service control point. A mobile station operable pursuant to the GSM network formed of the successor-generation network 18 is capable of utilizing the pre-paid calling service provided at the service control point. A corresponding service control point and pre-paid calling service is unavailable at the legacy network 16. Conventionally, the mobile station 12, operable pursuant to a service subscription to communicate by way of the legacy network 16.

The communication system 10 includes an apparatus 50 that permits the service resident at the service control point 44 to be made available to the mobile station 12 that would otherwise not be available to the mobile station. The apparatus 50 forms a bridge mechanism that bridges the networks 16 and 18. Here, the bridge mechanism is formed of separate functional parts associated with the separate networks. A first functional part 52 associated with the legacy network 16 operates as a wireless media gateway (WMG). And, a second functional part 54 operates as a wireless softswitch (WSS). The separate functional parts of the bridge mechanism forming the apparatus 50 communicate with one another, here indicated by the lines 56 and 58. The wireless media gateway 52 is coupled to the mobile switching center 26 of the legacy network 16.

The wireless media gateway 52 formed of the first functional part of the bridge mechanism operates as a voice and data bridge and includes functional elements including a message detector 64. The message detector detects a request generated at the legacy network for the mobile for the mobile station 12 to utilize the communication service resident at the service control point 44. An indication of detection of the message is provided, by way of the line 56, to the wireless softswitch 54.

The wireless softswitch also includes functional elements, including a message generator 66. The message generator is operable, responsive to detection by the message detector 64 of the request, to generate a request for permission for the mobile station to utilize the communication service provided by the service resident at the service control point. The request is routed to the service control point 44. A message representative of a grant of permission is returned by the service control point to the wireless softswitch 54, and a message detector 68 detects the permission-grant message. An indication of the detected message is returned, here by way of the line 58, to the wireless media gateway. A message generator 74 of the wireless media gateway generates a message, routable through the legacy network 16 that operates to authorize the mobile station to make use of the communication service provided at the service control point Even though the service control point is not otherwise associated with the legacy network 16, through operation of the apparatus 50 of an embodiment of the present invention, the mobile station is permitted to make use of the communication service.

In the exemplary implementation in which the legacy network 16 forms an IS-41, or ANSI-41, network and the network 18 forms a GSM network, the apparatus 50 forms a hybrid ANSI-41/GSM MSC. The hybrid MSC formed therefrom communicates using the protocols required of the IS-41 (or ANSI-41) network and also according to GSM/CAMEL protocols in the network 18. Subscribers to the legacy network are thereby able to take advantage of applications, such as advanced IN/CAMEL applications provided in the network 18 without requiring investments to be made at the legacy network to permit subscribers thereto to utilize the advanced applications.

Figure 2:
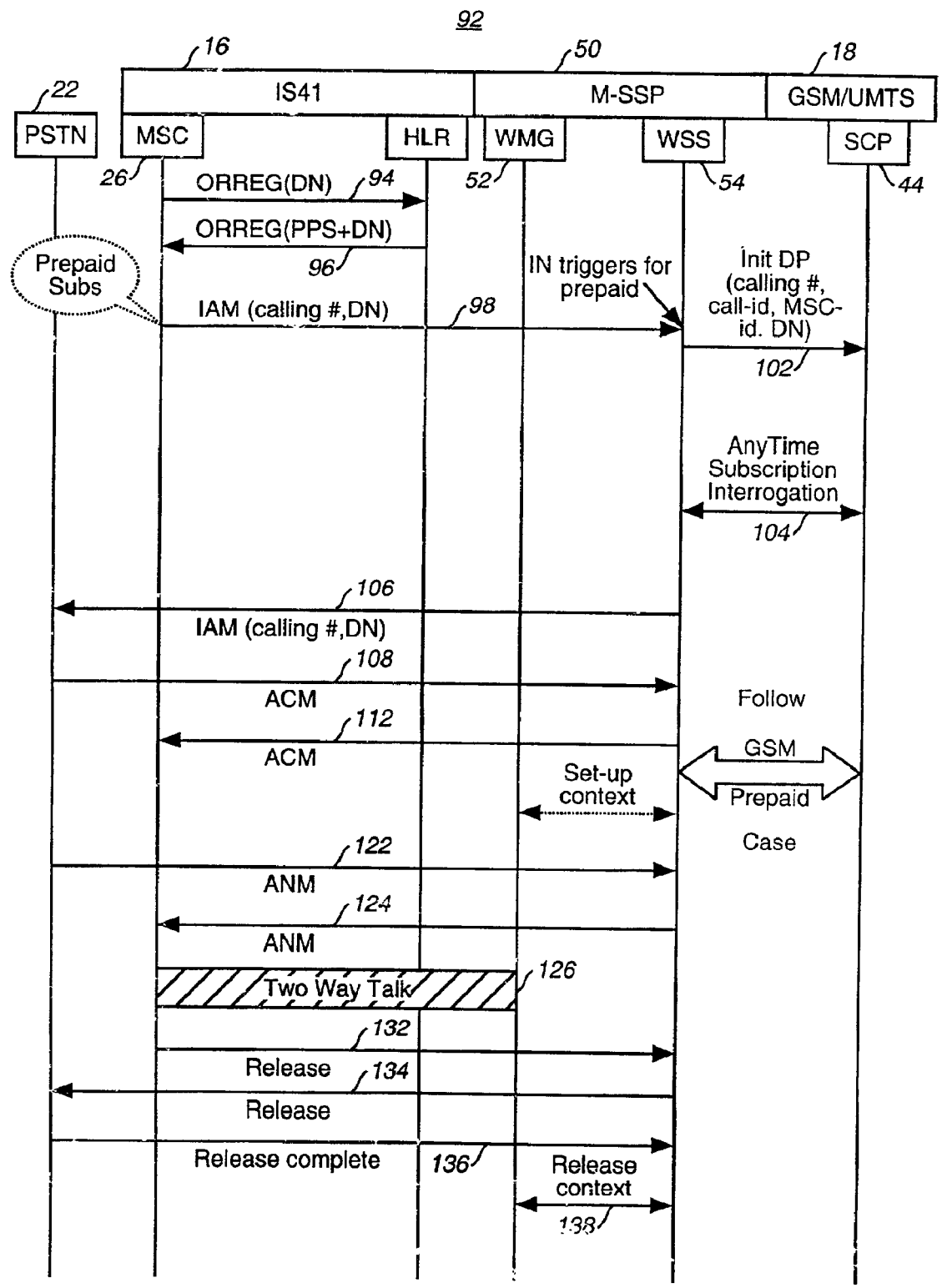
FIG. 2 illustrates a message sequence diagram representative of signaling generated during operation of an embodiment of the present invention.

FIG. 2 illustrates a message sequence diagram, shown generally at 92, representative of signaling generated during operation of the communication system 10, shown in FIG. 1, to permit a mobile station operable in the legacy network 16 to utilize a communication service associated with the service control point 44 of the successor-generation network 18. Here, again, the legacy network forms an IS-41 network, and the successor-generation network forms a GSM network that provides for CAMEL signaling and services.

Subsequent to registration of the mobile station in the IS-41 network again, the service associated with the service control point is a pre-paid calling service and the message sequence diagram 92 represents signaling generated as a mobile station originates a request to use the prepaid calling service to effectuate a communication session with a corresponding node.

First, and as indicated by the segment 94, an ORREG (DN) message generated by the mobile switching center 26 is provided to the home location register 28 of the IS-41 network. An ORREG (PPS+DN) message, indicated by the segment 96, is returned to the mobile switching center.

Responsive thereto, the mobile switching center routes a message, indicated by the segment 98, an IAM (calling number, DN) message, to the wireless softswitch 54 of the hybrid MSC 50. The wireless softswitch, in turn, generates an INIT DP (calling number, call-ID, MSC-ID, DN) message, indicated by the segment 102, that is routed to the service control point 44. Interrogation signaling, indicated by the segments 104, are exchanged.

Thereafter, and as indicated by the segment 106, an IAM (calling number, DN) message is returned to the IS-41 network and, in turn, to the PSTN 22 to a correspondent node attached thereto. An ACM message, indicated by the segment 108, is returned by the PSTN to the wireless softswitch 54, and an ACM response, indicated by the segment 112, is returned to the mobile switching center 112. Set-up context messaging, indicated by the segments 114, are communicated between the functional parts 52 and 54, i.e., the wireless media gateway and the wireless softswitch together with signaling generated between the wireless softswitch and the service control point 44, here indicated by the segments 116.

An ANM message, indicated by the segment 122, is routed by the PSTN 22 to the wireless softswitch. And, an ANM message, represented by the segment 124, is returned by the wireless softswitch to the mobile switching center 26 of the legacy network. A communication session, indicated by the "two-way talk" commences. When the communication session is to be terminated, a release message, indicated by the segment 132, is routed by the mobile switching center 26 to the wireless softswitch. A responding-release message, indicated by the segment 134, is provided to the PSTN 22, and in turn, the correspondent node, and a release complete message, indicated by the segment 136, is provided to the wireless softswitch of the hybrid MSC. Release context messages, indicated by the segments 138 are then exchanged between the wireless softswitch and the wireless media gateway of the hybrid MSC.

Figure 3:
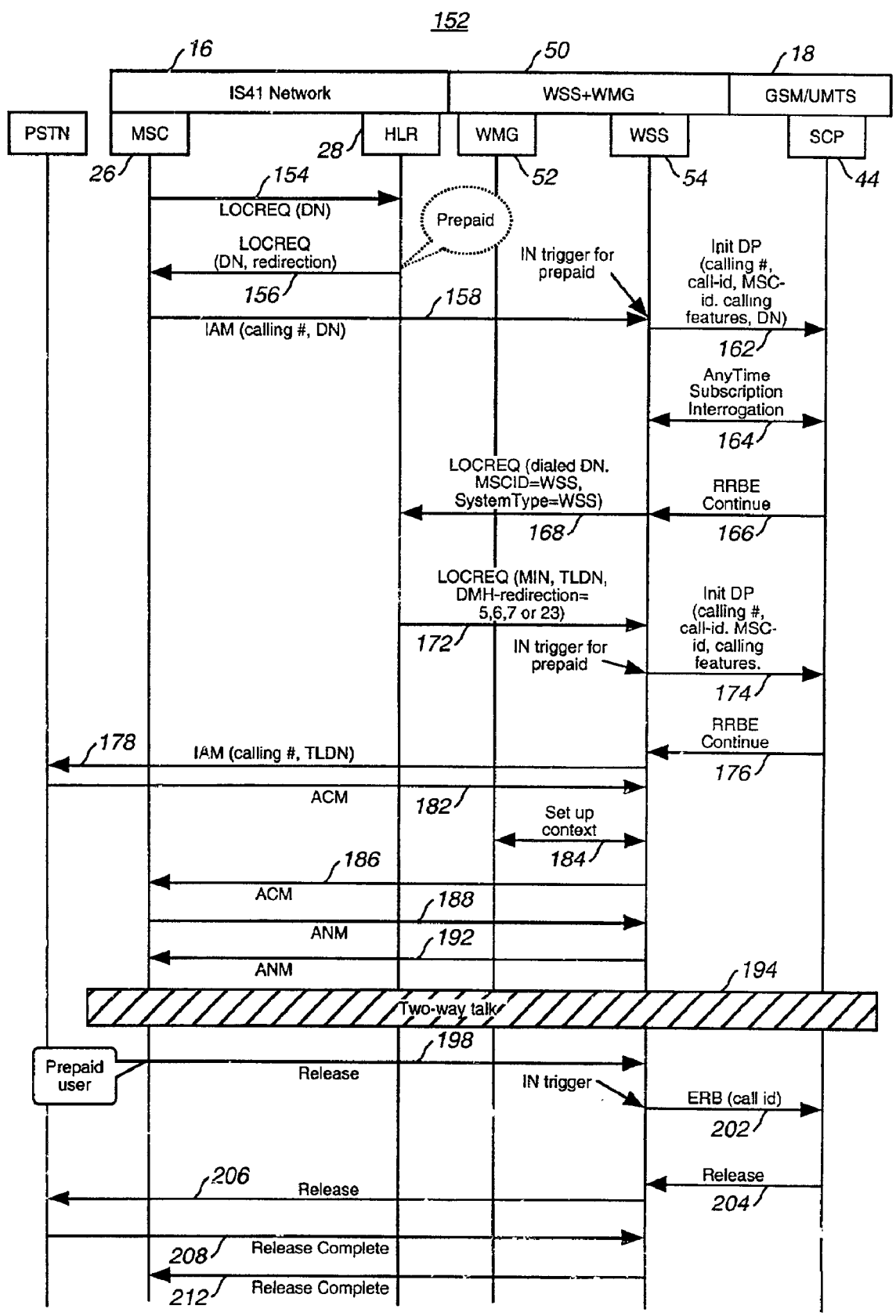
FIG. 3 illustrates another message sequence diagram, also representative of operation of an embodiment of the present invention implemented in the radio communication system shown in FIG. 1.

FIG. 3 illustrates a message sequence diagram, shown generally at 152, representative of signaling generated during operation of the communication system in which the mobile station defines a pre-paid subscriber and a call is to be terminated thereat. When the call is to be terminated at the mobile station, the call is first routed to the IS-41, home mobile switching center.

Here, the mobile switching center 26 generates an LOCREQ (DN) message, represented by the segment 154, that is routed to the home location register 28. The home location register returns an LOCREQ (DN, redirection) message, indicated by the segment 156, to the mobile switching center. Thereafter, and as indicated by the segment 158, an IAM (calling number, DN) message is routed by the mobile switching center 26 to the wireless softswitch 54. When received at the wireless softswitch, this message forms the IN (Intelligent Network) trigger for the pre-paid calling service. The wireless softswitch generates an INIT DP (calling number, call-ID, MSC-ID, calling features, DN) message 162 that is routed to the service control point 44. Messages, indicated by the segments 164 are exchanged between the service control point and the wireless softswitch. Thereafter, the service control point generates an RRBE continue message, indicated by the segment 166 that is routed to the wireless softswitch. And, in turn, the wireless softswitch generates an LOCREQ (dialed DN. MSC-ID=WSS, system type=WSS) message, indicated by the segment 168, that is routed to the home location register 28.

The HLR returns an LOCREQ (MIN, TLDN, DMH-redirection-5.6.7 or 23) message, indicated by the segment 172. Another IN trigger for the pre-paid service is generated, and an INIT DP (calling number, call-ID, MSC-ID, calling features) message, indicated by the segment 174, is routed to the service control point. The service control point responds with an RRBE continue message, indicated by the segment 176.

The wireless softswitch generates an IN (calling number, TLDN) message, indicated by the segment 178, that is routed to the PSTN 22. And, the PSTN generates an ACM message, indicated by the segment 182 that is routed to the wireless softswitch. Set-up context messages are exchanged, indicated by the segment 184 between the wireless media gateway and the wireless softswitch thereafter. And, the wireless softswitch then generates an ACM message, indicated by the segment 186, that is routed to the mobile switching center 26. Thereafter, the mobile switching center generates an ANM message, indicated by the segment 188 that is forwarded to the wireless softswitch 54. And, the wireless softswitch returns an ANM message, indicated by the segment 192. Thereafter, a communication session is effectuated, indicated by the block 194.

Here, the signaling indicates that the communication session is terminated by the mobile station. A release message, indicated by the segment 198, is generated by the mobile switching center 26. The message is routed to the wireless softswitch 54. In turn, an ERB (call ID) message, indicated by the segment 202, is generated and routed to the service control point. A release message, represented by the segment 204, is returned by the service control point to the softswitch. In turn, a release message, represented by the segment 206, is forwarded by the wireless softswitch to the PSTN. And, release complete messages, indicated by the segments 208 and 212, are forwarded, by the PSTN, to the softswitch and by the softswitch to the mobile switching center 26.

Figure 4:
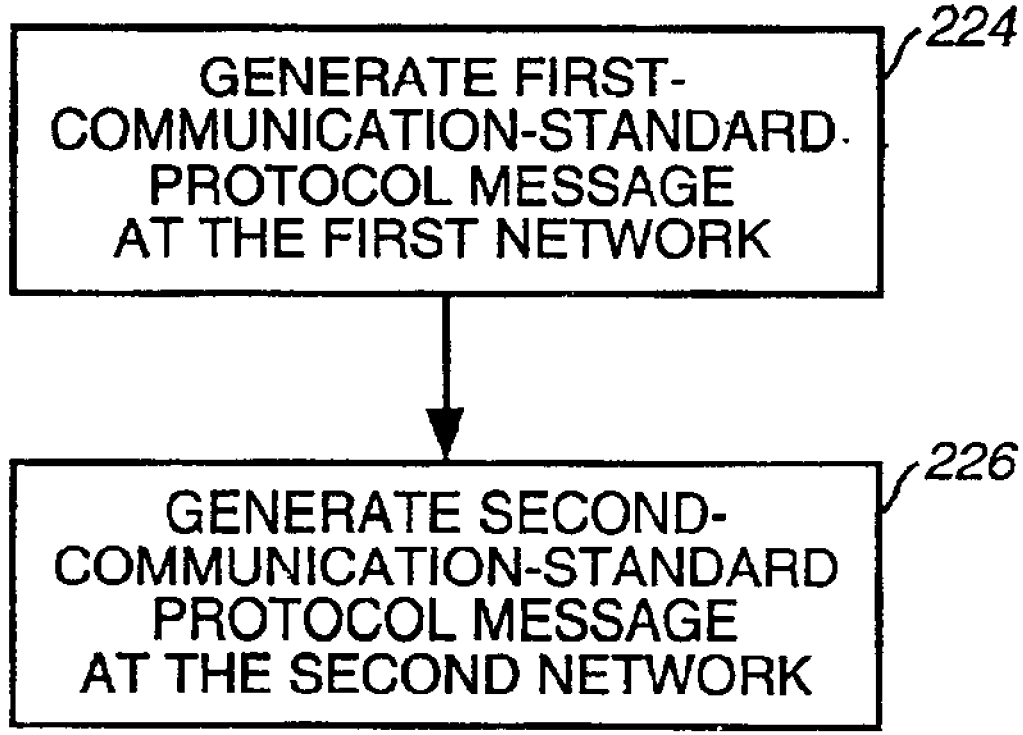
FIG. 4 illustrates a method flow diagram listing the method steps of the method of an embodiment of the present invention.

FIG. 4 illustrates a method 222 of an embodiment of the present invention. The method facilitates invocation of a second-network service, resident at a second-network service control point, by a mobile station. The mobile station is operable to communicate by way of a first network pursuant to a first-network communication service subscription. The first network operates pursuant to a first communication-standard protocol, and the second network is operable pursuant to a second communication-standard protocol.

First, and as indicated by the block 224, a first-communication-standard protocol message is generated at the first network. The message requests invocation of the second-network service by the mobile station. Then, and as indicated by the block 226, a second-communication-standard protocol message is generated. The second-communication-standard protocol is generated at the second network and is representative of the request for the invocation of the service by the mobile station.

The preferred descriptions are of preferred examples for implementing the invention, and the scope of the invention should not necessarily be limited by this description. The scope of the present invention is defined by the following claims.

What is claimed is:

1. In a radio communication system having a mobile station operable to communicate by way of a first network pursuant to a fist-network communication service subscription, the first network operable pursuant to a first communication-standard protocol and the first network coupled to a second network, the second network operable pursuant to a second communication standard protocol, an improvement of apparatus for facilitating invocation of a second-network service, resident at a second-network service control point, by the mobile station, said apparatus comprising:

a bridge mechanism coupled to receive a first-network-generated request for invocation of the second-network service by the mobile station, said bridge mechanism at least for selectably initiating authorization of the mobile station to involve the second-network service, the bridge mechanism comprising:
a first communication-standard protocol message detector, said first communication-standard protocol message detector for detecting the first communication-standard protocol message that requests the invocation of the second-network service;
a second communication-standard, protocol-request message generator for generating a second communication standard protocol-request message for communication to the second-network service control point to request invocation of the second-network service by the mobile station;
a second communication-standard, protocol-response message detector for detecting a second communication-standard protocol-response message generated by the second-network service control point and returned to said bridge mechanism; and
a first communication standard, protocol-response message generator coupled to receive indications of detection by said second communication-standard, protocol-response message detector of the second communication-standard protocol-response message, said first communication-standard protocol-response message generator for generating a first communication standard-protocol response message indicative of a value of the second communication-standard protocol response message.

2. In a radio communication system having a mobile station operable to communicate by way of a first network pursuant to a first-network communication service subscription, the first network operable pursuant to a first communication-standard protocol and the first network coupled to a second network, the second network operable pursuant to a second communication standard protocol, an improvement of apparatus for facilitating invocation of a second-network service, resident at a second-network service control point, by the mobile station, said apparatus comprising:

a bridge mechanism coupled to receive a first-network-generated request for invocation of the second-network service by the mobile station, said bridge mechanism at least for selectably initiating authorization of the mobile station to involve the second-network service, the bridge mechanism comprising:
a first functional part functionally operable pursuant to the first communication-standard protocol and a second functional part functionally operable pursuant to the second communication-standard protocol, wherein the first network is constructed pursuant to a communication standard that defines a media gateway and wherein the first functional part comprises media gateway functionality;
the second network is constructed pursuant to a communication standard that defines a softswitch and wherein the second functional part comprises softswitch functionality; and
the second-network service comprises a prepaid calling service and wherein the request for the invocation of the second-network service to which said bridge mechanism is coupled to receive comprises a request for the invocation of the prepaid calling service.

3. The apparatus of claim 2 wherein the first network comprises a registry at which service-subscription information associated with the mobile station is stored, the service-subscription information including an indication of association of the mobile station with the second-network service, and wherein the request for invocation of the second-network service to which said bridge mechanism is provided thereto subsequent to access to the service-subscription information stored at the registry.

4. The apparatus of claim 2 wherein the request for the invocation of the second-network service is detected by the first functional part of said bridge mechanism.

5. The apparatus of claim 2 wherein the authorization selectably initiated by said bridge mechanism is provided by the second functional part of said bridge mechanism.

6. The apparatus of claim 2 wherein the authorization selectably initiated by the second functional part of said bridge mechanism comprises a second-communication-standard protocol-formatted request routable by the second functional part to the second-network service control point.

7. In a method for communicating in a radio communication system having a mobile station operable to communicate by way of a first network pursuant to a first-network communication service subscription, the first network operable pursuant to a first communication-standard protocol and the fist network coupled to a second network, the second network operable pursuant to a second communication-standard protocol, an improvement of a method for facilitating invocation of a second-network service, resident at a second-network service control point, by the mobile station, said method comprising:

detecting a first-communication-standard protocol message from the first network to request invocation of the second-network service; and
translating the first-communication-standard protocol message to a second-communication-standard protocol message representative of the request for the invocation of the second-network service for routing to the second-network service control point; and
selectably granting the request for the invocation of the second-network service subsequent to the second-network accessing a registry of the first network which service-subscription information associated with the mobile station is stored, the service-subscription information including an indication of association of the mobile station with the second-network.

8. The method of claim 7 wherein the second-network service comprises a prepaid calling service and wherein the request for the invocation of the second-network service comprises a request for the invocation of the prepaid calling service.

9. The method of claim 7 comprising the further operation of:
generating a grant message at the second-network service control point, the grant message formatted pursuant to the second communication standard protocol.

10. The method of claim 9 comprising the further operation of:
converting the grant messaging into a first-communication-standard protocol-formatted message for routing the first network.

* * * * *